W. E. ELLIOTT.
SEAL.
APPLICATION FILED MAR. 8, 1915.

1,186,760.

Patented June 13, 1916.

Witnesses
Howard A. Garrington
Mac Parker

Inventor
William E. Elliott.
By Moulton & Liverance
Attorneys.

UNITED STATES PATENT OFFICE.

WILLIAM ELIJAH ELLIOTT, OF GRAND RAPIDS, MICHIGAN.

SEAL.

1,186,760.   Specification of Letters Patent.   Patented June 13, 1916.

Application filed March 8, 1915. Serial No. 12,906.

*To all whom it may concern:*

Be it known that I, WILLIAM ELIJAH ELLIOTT, a citizen of the United States of America, residing at Grand Rapids, in the county of Kent and State of Michigan, have invented certain new and useful Improvements in Seals; and I do hereby declare the following to be a full, clear, and exact description of the invention, such as will enable others skilled in the art to which it appertains to make and use the same.

My invention relates to improvements in seals for bolts or screws, and its object is to provide a seal adapted to prevent access to a bolt or screw, whereby removal of the same is prevented without first destroying or mutilating the seal.

In the form shown, the device is described as applied to screws which secure the cover plate or closure for the case or housing of a counting and controlling device such as shown in my co-pending application of even date herewith, filed March 8, 1915, Serial No. 12,907, in which the housing inclosing the mechanism is provided with a closure or cover plate which must be removed to gain access to the contents of the housing, said plate being secured in place by cap screws, which must be removed to detach the plate.

Figure 1:
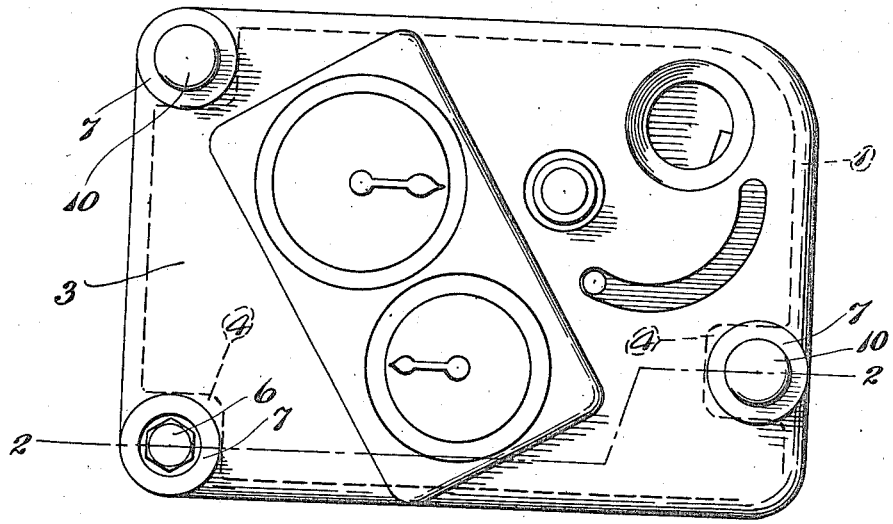
Figure 2:
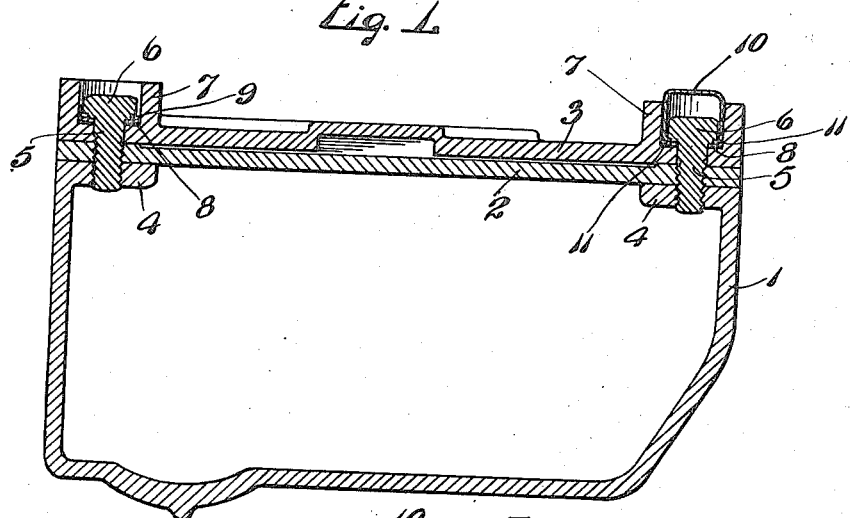
Figure 3:
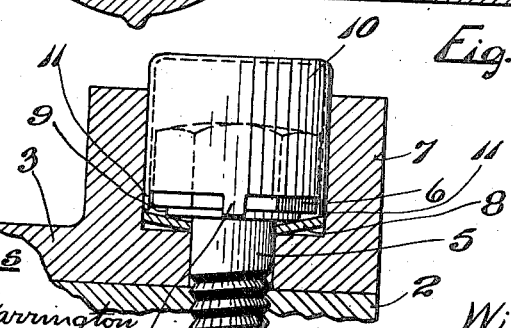

My invention consists essentially of a cup shaped metal seal inclosing the head of the screw, and independently rotative about the same, and secured in place by having its margin engaged with a groove, and also preferably externally cylindrical and surrounded by a protecting boss, as will more fully appear by reference to the accompanying drawing in which:

Figure 1 is an elevation of the housing as shown in said co-pending case, with my device applied to two of the screws therein. Fig. 2 a section of the same on the line 2—2 of Fig. 1. Fig. 3 an enlarged detail showing my device before the same is clenched in place.

Like numbers refer to like parts in all of the figures.

1 represents the body of the housing; 2 the plate to which the inclosed mechanism (not shown) is attached; 3 the closure for the housing secured in place by cap screws 5 extending through the plates 2 and 3 and into flanges or lugs 4 on the body 1.

Surrounding the head 6 of each cap screw, and providing a recess or cavity to receive said head, is a boss 7 spaced apart from the head to receive a socket wrench to insert or remove the screw and extending a distance beyond the head of the screw to protect the seal and screw head. In the bottom of this recess I prefer to insert a washer 8 of steel or other hard material having a concave surface adjacent the head of the screw to aid in clenching the seal in place and to form a groove or rabbet 9 in the bottom of the head to receive the inturned edge of the seal and secure it in place. If the plate 3 is a suitable material this washer may be omitted and the bottom of the recess in the boss made concave, but if the plate is quite soft I prefer to use the washer.

The seal 10, preferably consists of a thin cup shaped cap adapted to inclose the head of the screw, preferably being externally cylindrical and also rotative about the head of the screw and when forced to place by any convenient means will be turned at the lower or open end into the groove or rabbet 9 between the head and the washer at the bottom of the recess. This seal when in place is independently rotative about the screw head, whereby if turned by any means the screw will not be turned and being cylindrical on the outside, and preferably protected by the boss, cannot be readily turned even by a pipe wrench. Obviously the boss may be omitted for that the screw cannot be turned without mutilating or removing the seal.

To facilitate the clenching into the groove of the edge of the seal I prefer to form fingers or projections on the same as at 11, but these are not necessary if the seal be made of sufficiently soft and ductile material.

Obviously various modifications may be adapted without departing from the essence and spirit of my invention.

From the foregoing description the operation of my invention will be readily understood without further explanation. Obviously if a nut instead of a head is to be sealed it may be provided with a rabbet or groove and otherwise sealed as in case of a head, so also the seal can be readily applied to the round head of an ordinary screw as occasion may arise.

What I claim is:—

1. A seal for a screw or bolt, comprising a cup-shaped seal inclosing and having its outer part spaced from the head of the same and having its edge turned or clenched inward under said head.

2. The combination of a screw or bolt having a head provided with a circumferential groove or rabbet and a cup-shaped seal formed from thin metal inclosing and having its outer portion spaced from said head and having its edge turned and clenched into said groove or rabbet.

3. The combination of a screw or bolt having a head, a member through which the screw or bolt passes, said member having a boss surrounding the head, and a cup shaped seal of thin metal inclosing the head and having its edge turned or clenched inward under the head, the outer portion of the seal extending beyond said boss.

4. The combination of a screw or bolt having a head provided with a groove or rabbet, a plate through which the bolt extends provided with a boss surrounding the head of the screw or bolt and spaced apart therefrom, a cup shaped sheet metal seal inclosing the head of the bolt and freely rotative about the same and within the boss, and also having its edge turned inward or clenched into said groove.

In testimony whereof I affix my signature in presence of two witnesses.

WILLIAM ELIJAH ELLIOTT.

Witnesses:
   FRANK E. LIVERANCE, Jr.,
   H. H. YARRINGTON.